(12) United States Patent
Oh et al.

(10) Patent No.: US 10,595,095 B2
(45) Date of Patent: Mar. 17, 2020

(54) METHOD AND APPARATUS FOR TRANSCEIVING BROADCAST SIGNAL FOR VIEWING ENVIRONMENT ADJUSTMENT

(71) Applicant: LG ELECTRONICS INC., Seoul (KR)

(72) Inventors: Hyunmook Oh, Seoul (KR); Jongyeul Suh, Seoul (KR); Soojin Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/518,651

(22) PCT Filed: Nov. 18, 2015

(86) PCT No.: PCT/KR2015/012397
§ 371 (c)(1),
(2) Date: Apr. 12, 2017

(87) PCT Pub. No.: WO2016/080754
PCT Pub. Date: May 26, 2016

(65) Prior Publication Data
US 2017/0238062 A1    Aug. 17, 2017

Related U.S. Application Data

(60) Provisional application No. 62/081,590, filed on Nov. 19, 2014.

(51) Int. Cl.
*H04N 21/61* (2011.01)
*H04N 7/015* (2006.01)
(Continued)

(52) U.S. Cl.
CPC ......... *H04N 21/6106* (2013.01); *H04N 7/015* (2013.01); *H04N 7/08* (2013.01);
(Continued)

(58) Field of Classification Search
CPC .... H04N 19/70; H04N 21/84; H04N 21/2353; H04N 21/435; H04N 1/6086;
(Continued)

(56) References Cited

U.S. PATENT DOCUMENTS 9,264,661 B2 * 2/2016 Zhai ..................... H04N 19/117
2009/0219305 A1 * 9/2009 Diederiks ................ H04N 9/73
345/690

(Continued)

FOREIGN PATENT DOCUMENTS

EP    2717254 A1    4/2014
JP    2006-5418 A    1/2006
(Continued)

*Primary Examiner* — Ngoc K Vu
(74) *Attorney, Agent, or Firm* — Birch, Stewart, Kolasch & Birch, LLP

(57) ABSTRACT

The present invention provides a method and an apparatus for transceiving a broadcast signal for viewing environment adjustment. A method for transmitting a broadcast signal, in accordance with one embodiment of the present invention, comprises the steps of: encoding video data and signaling information including metadata regarding the production environment of the video data; generating a broadcast signal comprising the encoded video data and signaling information; and transmitting the generated broadcast signal.

3 Claims, 10 Drawing Sheets

(51) Int. Cl.
  *H04N 7/08* (2006.01)
  *H04N 21/2362* (2011.01)
  *H04N 21/81* (2011.01)
  *H04N 21/236* (2011.01)
  *H04N 21/434* (2011.01)
  *H04N 21/485* (2011.01)
  *H04N 21/235* (2011.01)
  *H04N 21/6379* (2011.01)

(52) U.S. Cl.
  CPC ....... *H04N 21/235* (2013.01); *H04N 21/2362* (2013.01); *H04N 21/23614* (2013.01); *H04N 21/4345* (2013.01); *H04N 21/4854* (2013.01); *H04N 21/6379* (2013.01); *H04N 21/816* (2013.01)

(58) Field of Classification Search
  CPC ...... H04N 9/3182; H04N 9/73; H04N 13/133; H04N 21/6106; G09G 5/10
  See application file for complete search history.

(56) References Cited

U.S. PATENT DOCUMENTS

| | | | | |
|---|---|---|---|---|
| 2011/0190911 | A1* | 8/2011 | Iwanami | H04N 21/235 700/90 |
| 2011/0273530 | A1* | 11/2011 | Suh | H04N 19/597 348/42 |
| 2013/0103703 | A1* | 4/2013 | Han | H04N 21/4126 707/755 |
| 2013/0279605 | A1* | 10/2013 | Krig | H04N 19/00545 375/240.26 |
| 2015/0089551 | A1* | 3/2015 | Bruhn | H04N 7/106 725/80 |
| 2016/0241906 | A1* | 8/2016 | Kim | H04N 5/4401 |

FOREIGN PATENT DOCUMENTS

| | | |
|---|---|---|
| KR | 10-0757057 B1 | 9/2007 |
| KR | 10-1328547 B1 | 11/2013 |
| WO | WO 2013/077698 A1 | 5/2013 |

\* cited by examiner

FIG. 5

| ambient_light_condition | Description |
|---|---|
| 0000 | Mastering ambient light A |
| 0001 | Mastering ambient light B |
| 0010 | Home viewing condition A |
| 0011 | Home viewing condition B |
| 0100 - 1110 | reserved |
| 1111 | User defined |

| ambient_light_color_temperature | Description |
|---|---|
| 0000 | Reference light : D65 |
| 0001 | Reference light : D50 |
| 0100 - 1110 | reserved |
| 1111 | User defined |

| viewer_position_condition | Description |
|---|---|
| 0000 | Viewer position A |
| 0001 | Viewer position B |
| 0100 - 1110 | reserved |
| 1111 | User defined |

FIG. 6

| Syntax | No. of bits | Format |
|---|---|---|
| TS_program_map_section() { | | |
|   table_id | 8 | uimsbf |
|   section_syntax_indicator | 1 | bslbf |
|   '0' | 1 | bslbf |
|   reserved | 2 | bslbf |
|   section_length | 12 | uimsbf |
|   program_number | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i = 0; i < N; i++) { | | |
|     descriptor() | | |
|   } | | |
|   for (i = 0; i < N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (i = 0; i < N2; i++) { | | |
|       descriptor() | | |
|     } | | |
|   } | | |
|   CRC_32 | 32 | rpchof |
| } | | |

L6010

| Syntax | No. of bits | Format |
|---|---|---|
| UHD_program_info_descriptor ( ) { | | |
|   descriptor_tag | 8 | uimsbf |
|   descriptor_length | 8 | uimsbf |
|   UHD_service_type | 4 | uimsbf |
|   Reserved | 4 | |
| } | | |

L6020

| UHD_service_type | 사용 예시 |
|---|---|
| 0000 | UHD1 |
| 0001 | UHD2 |
| 0010-0111 | Reserved |
| 1000-1111 | User_private |

L6030

UHD_service_type = 1010
(UHD1 service with adaptive viewing condition)

| Syntax | No. of bits | Format |
|---|---|---|
| event_information_table_section() { | | |
|   table_id | 8 | 0xCB |
|   section_syntax_indicator | 1 | '1' |
|   private_indicator | 1 | '1' |
|   reserved | 2 | '1' |
|   section_length | 12 | uimsbf |
|   source_id | 16 | uimsbf |
|   reserved | 2 | '11' |
|   version_number | 5 | uimsbf |
|   current_next_indicator | 1 | '1' |
|   section_number | 8 | uimsbf |
|   last_section_number | 8 | uimsbf |
|   protocol_version | 8 | uimsbf |
|   num_events_in_section | 8 | uimsbf |
|   for (j=0; j<num_events_in_section; j++) { | | |
|     reserved | 2 | '11' |
|     event_id | 14 | uimsbf |
|     start_time | 32 | uimsbf |
|     reserved | 2 | '11' |
|     ETM_location | 2 | uimsbf |
|     length_in_seconds | 20 | uimsbf |
|     title_length | 8 | uimsbf |
|     title_length | 2 | |
|     title_text() | var | |
|     reserved | 4 | '11' |
|     descriptors_length | 12 | |
|     for (i=0; i<N; i++) { | | |
|       descriptor() | | |
|     } | | |
|   } | | |
|   CRC_32 | 32 | rpchof |
| } | | |

L7020

| Syntax | No. of bits | Format |
|---|---|---|
| event_information_section() { | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for (i=0; i<N; i++) { | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for (i=0; i<N; i++) { | | |
|       descriptor() | | |
|     } | | |
|   } | | |
|   CRC_32 | 32 | rpchof |
| } | | |

FIG. 8

| Syntax | No. of bits | Format |
|---|---|---|
| viewing_condition_info_descriptor( ) { | | |
|   descriptor_tag | 8 | uimsbf |
|   descriptor_length | 8 | uimsbf |
|   reserved | 4 | |
|   number_of_info | 4 | |
|   for(i=0; i<number_of_info; i++) { | | |
|     viewing_condition_metadata () | | |
|   } | | |
| } | | |

— L8010

| viewing_condition_metadata(payloadSize) { | C | Descriptor |
|---|---|---|
|   ambient_light_condition | 4 | uimsbf |
|   reserved | 4 | uimsbf |
|   if(ambient_light_condition == '1111') { | | |
|     ambient_light_level | 8 | uimsbf |
|     reserved | 4 | uimsbf |
|     ambient_light_color_temperature | 4 | uimsbf |
|     if(ambient_light_color_temperature == 1111){ | | |
|       ambient_light_color_temperature_x | 8 | uimsbf |
|       ambient_light_color_temperature_y | 8 | uimsbf |
|     } | | |
|   } | | |
|   viewer_position_condition | 4 | uimsbf |
|   reserved | 4 | uimsbf |
|   if(position_condition == '1111') { | | |
|     viewer_position_dist | 8 | uimsbf |
|     viewer_position_angle | 8 | uimsbf |
|     viewer_position_height | 8 | uimsbf |
|     reference_for_position | 8 | uimsbf |
|   } | | |
| } | | |

$$\widehat{V} = f_V(Light_{ambient}, Light_{reference}) \cdot V + a_V \quad \sim L10010$$

$$\begin{bmatrix} \widehat{V}_R \\ \widehat{V}_G \\ \widehat{V}_B \end{bmatrix} = f_C(C_{ambient}, C_{reference}) \cdot \begin{bmatrix} V_R \\ V_G \\ V_B \end{bmatrix} + \begin{bmatrix} \alpha_R \\ \alpha_G \\ \alpha_B \end{bmatrix} \quad \sim L10020$$

$$\widehat{Y} = f_Y(Light_{ambient}, Light_{reference}) \cdot Y + \alpha_Y \quad \sim L10030$$

$$\begin{bmatrix} R' \\ G' \\ B' \end{bmatrix} = f_M(C_{ambient}, C_{reference}) \cdot \begin{bmatrix} R \\ G \\ B \end{bmatrix} + \begin{bmatrix} \alpha_r \\ \alpha_g \\ \alpha_b \end{bmatrix} \quad \sim L10040$$

METHOD AND APPARATUS FOR TRANSCEIVING BROADCAST SIGNAL FOR VIEWING ENVIRONMENT ADJUSTMENT

CROSS REFERENCE TO RELATED APPLICATIONS

This application is the National Phase of PCT International Application No. PCT/KR2015/012397, filed on Nov. 18, 2015, which claims priority under 35 U.S.C. 119(e) to U.S. Provisional Application No. 62/081,590, filed on Nov. 19, 2014, all of which are hereby expressly incorporated by reference into the present application.

TECHNICAL FIELD

The present invention relates to a method and apparatus for transmitting and receiving broadcast signals.

BACKGROUND ART

UHD broadcasting aims to provide richer color in comparison with existing broadcasting, and high-dynamic range (HDR) and wide color gamut (WCG) are being discussed. However, depending on the environment in which the display is viewed, color and brightness are recognized differently, and thus the color intended by the manufacturer may not be sufficiently expressed.

UHD broadcasting aims to provide improved image quality and sense of immersion to viewers compared to conventional HD broadcasting. In UHD broadcasting, UHD content provides information that is closest to the directly acquired color, through HVS, thereby forming the basis for providing improved image quality and sense of vividness. In the current broadcasting system, various post-processing steps are performed to improve color to obtain optimal color before content is transmitted. However, the color reproduction is not correct due to the difference between the viewing environment of the viewer and the working environment of the content producer.

DISCLOSURE

Technical Problem

An object of the present invention devised to solve the problem is to provide an optimal viewing environment for viewers.

Another object of the present invention is to provide metadata that is necessary for providing an optimal viewing environment to viewers.

Another object of the present invention is to provide a receiver operating method for providing an optimal viewing environment to viewers.

Technical Solution

The object of the present invention can be achieved by providing a method for transmitting a broadcast signal, including encoding video data and signaling information including metadata about a production environment of the video data, generating a broadcast signal containing the encoded video data and signaling information, and transmitting the generated broadcast signal.

Preferably, the metadata may include information about a target ambient light at a time of producing the video data and information about a target viewing position at the time of producing the video data.

Preferably, the metadata may include information about brightness of a target ambient light at a time of producing the video data and information about a color temperature of the target ambient light at the time of producing the video data.

Preferably, the metadata may include information about a target viewing distance at a time of producing the video data, information about a target viewing angle at the time of producing the video data, and information about a target viewing height at the time of producing the video data.

Preferably, the signaling information may include a descriptor related to a production environment of the video data, the descriptor including one or more of the metadata and information indicating the number of the metadata included in the descriptor.

Preferably, the signaling information may include Ultra High Definition (UHD) service information indicating a type of a UHD service including the video data, and the UHD service information including information for identifying that the UHD service is a UHD broadcast service including the metadata.

In another aspect of the present invention, provided herein is a method for receiving a broadcast signal, including receiving the broadcast signal containing video data and signaling information including metadata about a production environment of the video data, extracting the video data and signaling information from the received broadcast signal, and decoding the extracted video data and signaling information.

Preferably, the metadata may include information about a target ambient light at a time of producing the video data and information about a target viewing position at the time of producing the video data.

Preferably, the metadata may include information about brightness of a target ambient light at a time of producing the video data and information about a color temperature of the target ambient light at the time of producing the video data.

Preferably, the metadata may include information about a target viewing distance at a time of producing the video data, information about a target viewing angle at the time of producing the video data, and information about a target viewing height at the time of producing the video data.

Preferably, the signaling information may include a descriptor related to a production environment of the video data, the descriptor including one or more of the metadata and information indicating the number of the metadata included in the descriptor.

Preferably, the signaling information may include Ultra High Definition (UHD) service information indicating a type of a UHD service including the video data, and the UHD service information including information for identifying that the UHD service is a UHD broadcast service including the metadata.

In another aspect of the present invention, provided herein is an apparatus for transmitting a broadcast signal, including an encoder configured to encode video data and signaling information including metadata about a production environment of the video data, a broadcast signal generator configured to generate a broadcast signal containing the encoded video data and signaling information, and a transmitter configured to transmit the generated broadcast signal.

In another aspect of the present invention, provided herein is an apparatus for receiving a broadcast signal, including a receiver configured to receive the broadcast signal containing video data and signaling information including metadata about a production environment of the video data, an extractor configured to extract the video data and signaling information from the received broadcast signal, and a decoder configured to decode the extracted video data and signaling information.

Advantageous Effects

According to some embodiments of the present invention, an optimal viewing environment may be provided to viewers.

According to some embodiments of the present invention, metadata necessary for providing an optimal viewing environment to viewers may be provided.

According to some embodiments of the present invention, a receiver operating method for providing an optimal viewing environment to viewers may be provided.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 is a diagram illustrating configuration of an ambient_light_condition field, an ambient_light_color_temperature field, and a viewer_position_condition field according to an embodiment of the present invention;

FIG. 6 is a diagram illustrating signaling of a UHD service based on viewing condition metadata according to an embodiment of the present invention;

FIG. 7 is a diagram illustrating signaling of a UHD service based on viewing condition metadata according to another embodiment of the present invention;

FIG. 8 is a diagram illustrating configuration of viewing_condition_info_descriptor( ) and configuration of viewing condition metadata according to an embodiment of the present invention;

FIG. 10 is a diagram illustrating equations used in adjusting the brightness and/or color of a display and/or content to provide an optimal viewing environment, in accordance with an embodiment of the present invention;

BEST MODE

Hereinafter, embodiments of the present invention will be described in detail with reference to the accompanying drawings, but the present invention is not restricted or limited by the embodiments.

As used herein, terms used in the present invention are selected from general terms that are widely used in the present invention while taking into account the functions of the present invention, but these may vary depending on the intention or custom of a person skilled in the art or the emergence of new technologies. Additionally, in certain cases, there may be a term arbitrarily selected by the applicant, and in this case, the meaning thereof will be described in the corresponding part of the description of the invention. Accordingly, therefore, it is intended that the terminology used herein should be interpreted based on the meaning of the terms rather than on the name of the terms, and on the entire contents of the specification.

Figure 1:
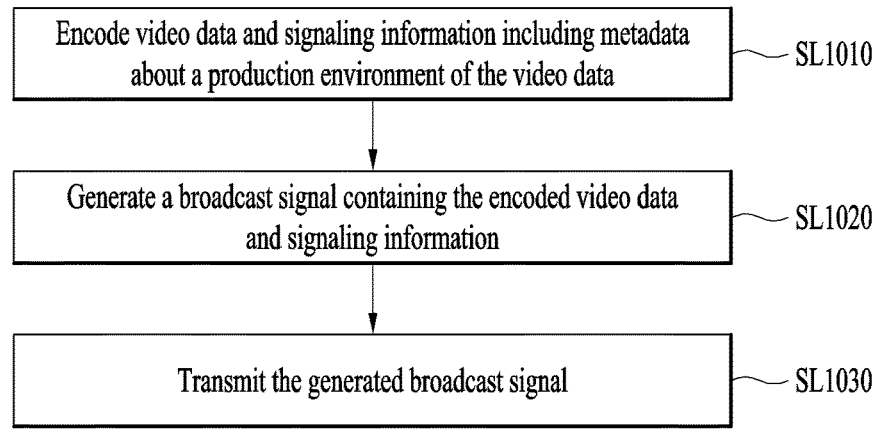
FIG. 1 illustrates a method for transmitting a broadcast signal according to an embodiment of the present invention.

FIG. 1 illustrates a method for transmitting a broadcast signal according to an embodiment of the present invention.

The method for transmitting a broadcast signal according to an embodiment of the present invention includes encoding video data and signaling information including metadata about a production environment of the video data (SL1010), generating a broadcast signal containing the encoded video data and signaling information (SL1020) and/or transmitting the generated broadcast signal (SL1030). Here, the metadata about the production environment of the video data may represent viewing condition metadata. A detailed description thereof will be given later with reference to FIG. 4.

According to another embodiment, the metadata may include information about target ambient light at the time of producing the video data and/or information about a target viewing position at the time of producing the video data. Here, the information about the ambient light at the time of producing the video data may represent the information indicated by the ambient_light_condition field, and the information about the target viewing position at the time of producing the video data may represent the information indicated by the viewer_position_condition field. A detailed description thereof will be given later with reference to FIGS. 4 and 5.

According to another embodiment, the metadata may include information about the brightness of the target ambient light at the time of producing the video data and/or information about the color temperature of the target ambient light at the time of producing the video data. The information about the brightness of the target ambient light at the time of producing the video data may represent the information indicated by the ambient_light_level field and the information about the color temperature of the target ambient light at the time of producing the video data may represent the information indicated by the ambient_light_color_temperature field. A detailed description thereof will be given later with reference to FIGS. 4 and 5.

According to another embodiment, the metadata may include information about a target viewing distance at the time of producing the video data, information about a target viewing angle at the time of producing the video data, and/or information about a target viewing height at the time of producing the video data. Here, the information about the target viewing distance at the time of producing the video data, the information about the target viewing angle at the time of producing the video data, and the information about the target viewing height at the time of producing the video data may represent information indicated by a viewer_position_dist field, a viewer_position_angle field, a viewer_position_height field, and a reference_for_position field. A detailed description thereof will be given later with reference to FIGS. 4 and 5.

According to another embodiment, the signaling information may include a descriptor about the production environment of the video data. The descriptor may include one or more of the metadata and/or information indicating the number of the metadata included in the descriptor. Here, the metadata may indicate a viewing_condition_info_descriptor, and the information indicating the number of metadata included in the descriptor may represent information indicated by the number_of_Info field. A detailed description thereof will be given later with reference to FIG. 8.

According to another embodiment, the signaling information may include UHD service information indicating the type of a UHD (Ultra High Definition) service including the video data, and the UHD service information may include information for identifying that the UHD service is a UHD broadcast service including the metadata. Herein, the UHD service information may refer to UHD_program_info_descriptor and/or information included in this descriptor. The information for identifying that the UHD service is a UHD broadcast service including the metadata may represent information indicated by the UHD_service_type field. A detailed description thereof will be given later with reference to FIG. 6.

Figure 2:
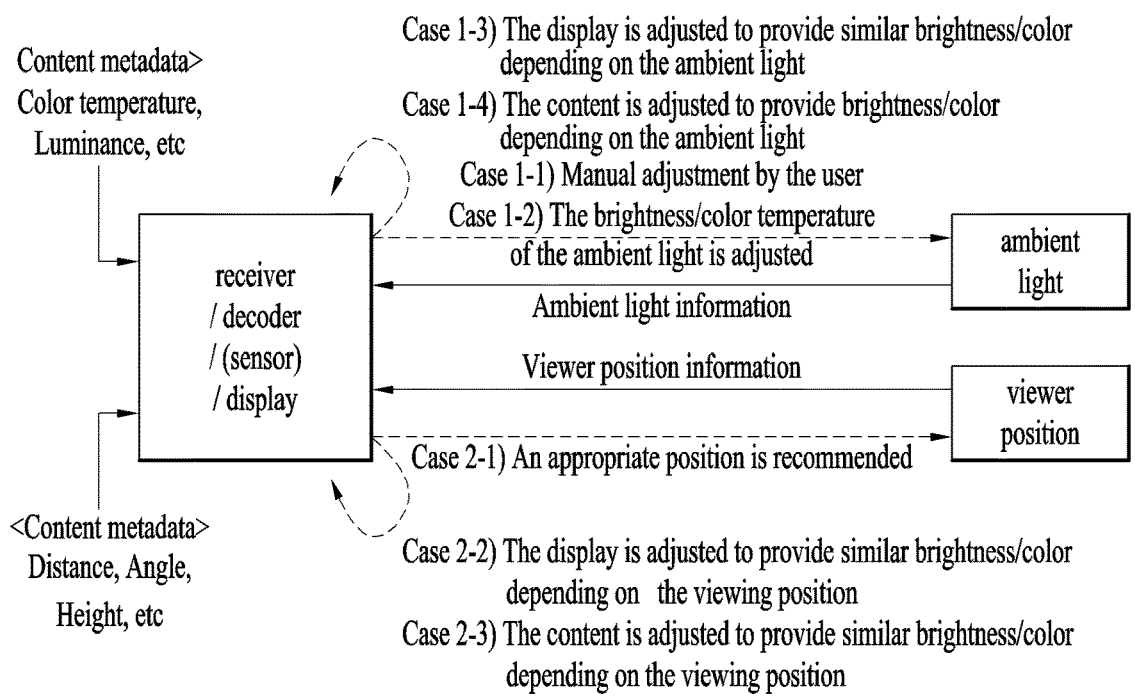
FIG. 2 illustrates a viewing environment adjustment method based on image production environment information according to an embodiment of the present invention.

FIG. 2 illustrates a viewing environment adjustment method based on image production environment information according to an embodiment of the present invention.

An embodiment of the present invention may provide a method for delivering rich color and brightness originally intended by a content creator to a viewer. In an embodiment, an element that may control a viewing environment of a viewer may be transmitted to a receiver and an optimal viewing environment in terms of color and brightness may be provided based on the element.

An embodiment of the present invention may provide a viewing environment for optimally expressing the color and/or brightness of UHD content based on the image production related information provided by the content creator or the content provider.

In an embodiment, ambient environment information at the time of image production may be transmitted to a receiver for accurate color reproduction. Here, the ambient environment information may include ambient light information (brightness, color temperature, etc.) and/or position information (viewing distance, viewing angle, viewing height, etc.).

In an embodiment, information about a broadcast service to be provided to a user at present or in the future may be provided by announcing, at the system level, that the ambient environment information is provided.

The receiver according to an embodiment of the present invention may analyze the ambient environment information at the time of image production transmitted through the metadata and compare the current viewing environment of the viewer with a recommended viewing environment (ambient environment information at the time of producing the image) to determine whether the current viewing environment needs to be adjusted. The adjustment operation may be manually performed depending on performance of the receiver. The display of the receiver may be adjusted, or the content may be adjusted. In an embodiment of the invention, the brightness and/or color of the display may be adjusted when adaptively adjusting the display to the ambient environment. In an embodiment, the brightness and/or color of the content may be adjusted when the content is adaptively adjusted according to the ambient environment. Here, adaptively adjusting the display and/or the content according to the ambient environment may mean adjusting the display and/or content in consideration of the ambient environment. In an embodiment of the invention, if feedback of the result of adjustment of the display and/or content is possible, the display and/or content may be adjusted until the result comes within an error range.

According to an embodiment of the present invention, the producer may provide reference information about a viewing environment suitable for the content. Thereby, the producer may deliver the rich color and/or brightness intended by the producer to the viewer, and the viewer may be provided with a suitable viewing environment.

In an embodiment, a method for defining an element related to an environment suitable for viewing an image and providing information about the environment by a transmitting party and/or a source of the image may be provided. In an embodiment, operation of the receiver performed when ambient information is provided may be defined.

The aforementioned figure illustrates the overall concept of the present invention. This figure illustrates a case in which ambient light and/or viewing position are considered among other factors affecting image viewing according to an embodiment of the present invention. The current information about the factors affecting image viewing according to an embodiment of the present invention may be predefined or directly measured and then delivered to the receiver. In an embodiment, information about a recommended viewing environment of an image that is currently being played back (or to be reproduced in the future) may be analyzed, and factors affecting a user's viewing of the image may be adjusted using the result of analysis. The receiver may control the respective factors and/or adjust the display environment, thereby creating an optimal viewing environment.

In this figure, the receiver, decoder, sensor and/or display may receive ambient environment information at the time of content creation as metadata. Here, the surrounding information may include information about the surrounding luminance, the surrounding color temperature, the recommended viewing distance, the recommended viewing angle, and/or the recommended viewing height. The receiver, decoder, sensor and/or display may receive current viewing position information about the viewer and/or ambient light information from the viewer. Using the information about the ambient environment at the time of content creation received from the transmitting party and the viewing position information/ambient light information received from the viewer by the receiver, decoder, sensor and/or display, Case 1-1) the user may manually adjust the ambient light; Case 1-2) the receiver may adjust the brightness and/or color temperature of the ambient light, Case 1-3) the display may be adjusted to provide similar brightness and/or color depending on the ambient light, Case 2-1) an appropriate viewing position may be recommended for the viewer, Case 2-2) the display may be adjusted to provide similar brightness and/or color depending on viewing position, and Case 2-3) the content may be adjusted to provide similar brightness and/or color depending on viewing position.

In an embodiment, ambient light and viewing position are taken into consideration as elements related to the viewing environment. The embodiment is similarly applicable to other elements. The information delivered by the producer for the viewing environment according to an embodiment of the present invention may include information about an environment of a mastering step of determining the color and brightness of images, a viewing environment according to local characteristics or time, and/or a standard viewing environment. In an embodiment, when the above-mentioned viewing environment information is delivered, the receiver is caused to create an appropriate viewing environment by comparing the delivered viewing environment with the current viewing environment. Thereby, images having rich colors and brightness intended by the producer may be provided.

In an embodiment, ambient light may be taken into consideration as a factor that affects image viewing. Factors such as brightness, color temperature, and the like may be further taken into consideration as elements of the ambient light. According to one embodiment of the present invention, it is necessary to measure the current illuminance environment to determine whether the current viewing environment coincides with the viewing environment intended by the producer. According to an embodiment of the present invention, the current illuminance environment may be identified by selecting one of predefined light information (e.g., D65, D50, incandescent lamp, etc.) or by separately measuring and inputting the illumination brightness and/or the color temperature (it is also possible to measure the change in illumination brightness and/or color temperature during specific times, such as morning, afternoon, evening, etc., and to measure and input the illumination brightness and/or the color temperature when initial setting of the display is performed), or may be identified by measuring the illumination brightness and/or the color temperature in real time using an illuminance sensor or a color temperature sensor. According to an embodiment of the present invention, the accuracy of the identified information is highest when the illuminance sensor, the color temperature sensor, or the like is used, and is lowest when predefined light information is used.

According to an embodiment of the present invention, once the illuminance environment information for the current viewing environment is acquired through the method described above, an optimum environment may be created based on the recommended illuminance environment information transmitted from the transmitting part. In an embodiment, the ambient light may be directly controlled based on the recommended illuminance environment information transmitted from the transmitting party.

In an embodiment, the user may be allowed to directly adjust the ambient light through an announcement. In an embodiment of the present invention (Case 1-1, manual adjustment by the user), the user may be allowed to directly adjust the brightness and/or the color in the case where the receiver cannot perform separate processing for controlling the ambient light. In an embodiment, when the current illuminance environment is identified based on the previously provided illuminance information, all of the recommended illuminance environment information transmitted from the transmitter and the previously provided illuminance information are delivered to the viewer to enable the user to directly adjust the ambient light. According to an embodiment of the present invention, when the current illuminance environment is identified based on the light information measured in real time, the ambient light may be adjusted to an appropriate range by feeding back the result of adjustment of the ambient light conducted by the user.

According to another embodiment, the receiver may be allowed to directly adjust the ambient light. In (Case 1-2, Direct adjustment of the ambient light by the receiver) an embodiment of the present invention, when the ambient light can be controlled by the receiver, the receiver may adjust the ambient light using the recommended illuminance environment information and the current illuminance environment information, which are transmitted from the transmitting party. According to an embodiment of the present invention, when a separate light controller is arranged outside the receiver, the receiver may forward the recommended illuminance environment information and/or the current illuminance environment information transmitted from the transmitting party to the light controller, and the light controller may control the ambient light based on the information. In an embodiment, the receiver or the light controller may be allowed to adjust the ambient light through a technology such as Internet of Things communication.

According to another embodiment, the brightness and/or the color of the display and/or content may be adjusted when it is difficult to change the ambient light in the current viewing environment. (Case 1-3, Adjustment of brightness and/or color of the display, Case 1-4, Adjustment of brightness and/or color of content)

For example, when the brightness of the ambient light is higher than the brightness of the recommended light, the brightness displayed on the display is recognized as being lower than the brightness intended by the producer. The brightness of the display may be enhanced through compensation of the brightness, or the perceived brightness may be compensated by enhancing the brightness of the content. Further, in an embodiment of the present invention, the adjusted brightness of the display and/or content may be pre-announced, and the user may be allowed to determine whether to use the adjusted brightness. Further, in an embodiment of the present invention, when the current illuminance environment is identified based on the light information measured in real time, accuracy of the adjustment may be improved by feeding back the result of adjustment of the display and/or adjustment results in real time.

In an embodiment, a viewing position may be taken into consideration as a factor affecting image viewing. Further, the viewing distance, the viewing angle, the viewing height, and the like with respect to the reference screen size may be taken into consideration regarding the viewing position. According to an embodiment of the present invention, the current viewing position may be identified by allowing the user to directly input the current viewing position and/or by measuring the current viewing position in real time using a measurement mechanism capable of providing information to the receiver. For example, in an embodiment of the present invention, the position of the viewer may be estimated through an object tracking algorithm using a camera.

According to an embodiment of the present invention, when the current viewing position information about the viewer is acquired through the above-described method, an optimum environment may be created based on the recommended viewing position information transmitted from the transmitting party. In an embodiment, the viewing position may be directly controlled based on the recommended viewing position information transmitted from the transmitting party.

In an embodiment, the user may be allowed to directly adjust the viewing position through an announcement. In an embodiment of the present invention (Case 2-1, Recommending an appropriate viewing position for the viewer), when the current viewing position of the user is identified based on pre-provided viewing position information, both the recommended viewing position transmitted from the transmitting party and the pre-provided viewing position information may be provided to the viewer to allow the user to directly adjust the viewing position. According to an embodiment of the present invention, when the current viewing position is identified based on the viewing position measured in real time, the result of the viewing position adjustment performed by the user may be fed back in real time such that the viewing position may be adjusted to an appropriate range. Furthermore, in an embodiment of the present invention, the user may be allowed to directly adjust the position of an object such as a chair, a sofa, and the like.

In another embodiment, the brightness and/or colors of the display and/or content may be adjusted when it is difficult to change the current viewing position (Case 2-2, Adjusting the brightness and/or color of the display according to the distance after measuring the viewing distance, Case 2-3, Adjusting the brightness and/or color of the content according to the distance after measuring the viewing distance).

For example, if the current viewing position of the user is closer than the recommended viewing position, the user may feel that the brightness is higher than the intended brightness (because the perceived brightness is influenced not only by the actual brightness but also by the area of the bright region). In this case, the perceived brightness is compensated for by reducing the overall brightness of the display or by relatively reducing the brightness of a bright region of the content. On the contrary, when the viewing position of the user is at a longer distance than the recommended viewing position, the area of the bright region affecting the optic nerve is relatively small, and thus the perceived brightness may be relatively low. In this case, the perceived brightness may be compensated for by increasing the brightness of the display or increasing the area of the bright region in the content.

Figure 3:
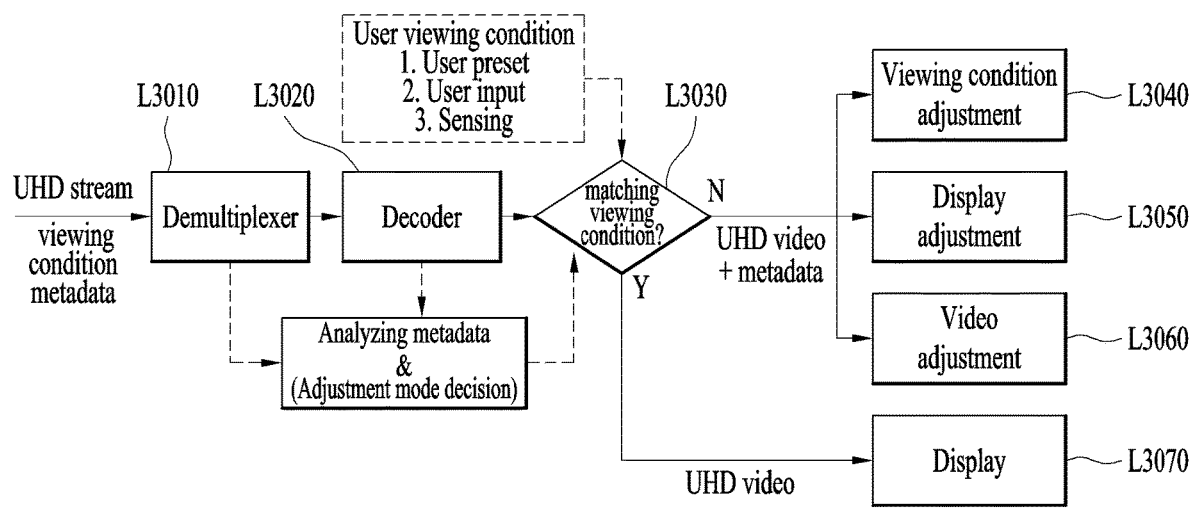
FIG. 3 is a block diagram of a receiver for automatic adjustment of a viewing environment according to an embodiment of the present invention.

FIG. 3 is a block diagram of a receiver for automatic adjustment of a viewing environment according to an embodiment of the present invention.

A receiver according to an embodiment of the present invention may include a demultiplexer L3010, a decoder L3020, a controller L3030 and/or a display L3040.

The demultiplexer L3010 may receive a broadcast signal including UHD content and/or recommended viewing environment information, which is the ambient environment information at the time of content creation, and may extract the UHD contents and/or recommended viewing environment information from the received broadcast signal.

The decoder L3020 may decode the video stream and/or audio stream transmitted from the demultiplexer. According to an embodiment of the present invention, the recommended viewing environment information may be included in the system information or included in the SEI message of the video stream.

The controller L3030 may compare the received recommended viewing environment information with the current viewing environment information indicating the current viewing environment of the user. If the current viewing environment information matches the recommended viewing environment information as a result of the comparison, the controller may deliver the received content to the display. If the current viewing environment information does not match the recommended viewing environment information as a result of the comparison, the controller may adjust the viewing environment, the display, and/or the content.

The display L3040 may display the adjusted content and/or the original content.

Figure 4:
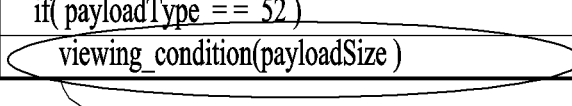
FIG. 4 is a diagram illustrating configuration of viewing condition metadata and configuration of an SEI message including the viewing condition metadata according to an embodiment of the present invention.

FIG. 4 is a diagram illustrating configuration of viewing condition metadata and configuration of an SEI message including the viewing condition metadata according to an embodiment of the present invention.

According to an embodiment of the present invention, a criterion for determining whether a viewing environment of a viewer is an appropriate viewing environment may be the recommended viewing environment information transmitted from a transmitting party. The recommended viewing environment information according to an embodiment of the present invention may be referred to as viewing condition metadata. The viewing condition metadata may be transmitted in the SEI message of the video stream.

According to an embodiment of the present invention, an SEI message including the viewing condition metadata may be referred to as a viewing condition metadata SEI message.

According to an embodiment of the present invention, the viewing condition metadata SEI message may include information about a target ambient light environment at the time of production and/or information about a target viewing position of the viewer at the time of production. The viewing condition metadata SEI message according to an embodiment of the present invention may be referred to as an ambient viewing environment SEI message.

The ambient viewing environment SEI message identifies the characteristics of the nominal ambient viewing environment for display of the associated video content.

The syntax elements of the ambient viewing environment SEI message may assist the receiving system in adapting the received video content for local display in viewing environments that may be similar or may substantially differ from those assumed or intended when mastering the video content. That is, the viewing condition metadata SEI message according to an embodiment of the present invention may be used for the receiver to adjust the received video content, and adjustment of the video content may be performed on the display of the receiving party having a viewing environment different from the viewing environment intended at the time of production, such that the viewer may experience a viewing environment as similar to the intended viewing environment at the time of production as possible.

This SEI message does not provide information about color transformations that would be appropriate to preserve creative intent on displays with color spaces different from that of the described mastering display.

According to an embodiment, when an ambient viewing environment SEI message is present for any picture of a CLVS of a particular layer and the first picture of the CLVS is an IRAP picture, the ambient viewing environment SEI message shall be present for that IRAP picture. According to an embodiment, the ambient viewing environment SEI message persists for the current layer in decoding order from the current picture until the end of the CLVS. According to an embodiment, all ambient viewing environment SEI messages that apply to the same CLVS shall have the same content.

The viewing condition metadata SEI message L4010 may include viewing condition metadata (viewing_condition), and the viewing condition metadata L4020 may include an ambient_light_condition field, an ambient_light_level field, an ambient_light_color_temperature field, an ambient_light_color_temperature_x field, an ambient_light_color_temperature_y field, a viewer_position_condition field, a viewer_position_dist field, a viewer_position_angle field, a viewer_position_height field and/or a reference_for_position field.

The ambient_light_condition field indicates information about an appropriate ambient light environment in which the color and brightness intended by the producer can be viewed in an optimum state. According to an embodiment, the information indicated by this field may be referred to as recommended ambient light information. This field may contain ambient light information used for production or image editing and/or creation by the content provider. This field may contain commonly agreed upon ambient light information. For example, if the value of this field is 0000 (Mastering ambient light A), this may indicate that the ambient light at the time of production is a 10-nit D65 light in a space of 8 m³. If the value of this field is 0001 (Mastering ambient light B), 0010 (Home viewing condition A) or 0011 (Home viewing condition B), this may indicate that the corresponding agreed ambient light information is used as ambient light information at the time of production. If the value of this field is 1111, this may indicate that arbitrary ambient light information is used as the recommended ambient light information. If the value of this field is 1111, the brightness and color temperature information about arbitrary ambient light may be directly transmitted.

The ambient_light_level field indicates the brightness of arbitrary ambient light when arbitrary ambient light information is used as the recommended ambient light information. According to another embodiment, this field may indicate the brightness (illuminance) of the ambient light used as the recommended ambient light information regardless of whether the ambient light information agreed to be used as the recommended ambient light information is used or arbitrary ambient light information is used. According to one embodiment, this field may indicate information about the ambient illuminance of the ambient viewing environment. According to an embodiment, this field may indicate information about the ambient illuminance in units of 0.0001 lux. According to an embodiment, this field may be referred to as an ambient illuminance field.

The ambient_light_color_temperature field indicates color temperature information of an arbitrary ambient light when arbitrary ambient light information is used as the recommended ambient light information. The value 0000 in this field may indicate that a reference light D65 is used, 0001 may indicate that a reference light D50 is used, and 1111 may indicate that arbitrary non-reference light is used. When the value of this field is 1111, a color coordinate for expressing the color temperature of any light may be directly transmitted.

The ambient_light_color_temperature_x field indicates the x coordinate in the CIE color space for expressing color temperature when an arbitrary ambient light is not a reference light. In an embodiment, coordinates other than the CIE color space may be used, and when it is necessary to use and distinguish various color spaces, information indicating the types of the color spaces may be transmitted through separate signaling. In another embodiment, this field may indicate an x-coordinate in the color space for expressing the color temperature of the ambient light used as the recommended ambient light information regardless of whether the ambient light information agreed to be used as the recommended ambient light information is used or arbitrary ambient light information is used, and whether the ambient light in use is a reference light. In an embodiment, this field may specify the normalized x chromaticity coordinate of the environmental ambient light in the nominal viewing environment in normalized increments of 0.00002, according to the CIE 1931 definition of x and y as specified in ISO 11664-1 (see also ISO 11664-3 and CIE 15). The value of this coordinate shall be in the range of 0 to 50000. This field may be referred to as an ambient_light_x field.

The ambient_light_color_temperature_y field indicates a y coordinate in the CIE color space for expressing the color temperature when the arbitrary ambient light is not a reference light. According to another embodiment, this field may indicate a y coordinate in the color space for expressing the color temperature of the ambient light used as the ambient light information regardless of whether the ambient light information agreed to be used as the recommended ambient light information is used and whether the ambient light in use is a reference light. According to an embodiment, this field may specify the normalized y chromaticity coordinate of the environmental ambient light in the nominal viewing environment in normalized increments of 0.00002, according to the CIE 1931 definition of x and y as specified in ISO 11664-1 (see also ISO 11664-3 and CIE 15). The value of this coordinate shall be in the range of 0 to 50000. This field may be referred to as an ambient_light_y field.

The viewer_position_condition field indicates viewing position information about the viewer for an optimal viewing environment. According to an embodiment, the information indicated by this field may be referred to as recommended viewing position information. For example, the value 0000 (Viewer position A) of this field may be predefined to indicate that the screen is viewed at the same height as the center of the screen at a distance of 1.5 times the height from the floor to the screen center, a viewing angle of 58° for a 3840×2160 screen of 16:9 ratio. The value 0001 (View position B) of this field indicates viewing position information having a viewing distance, viewing angle and/or viewing height different from that of View position A. The value 1111 of this field indicates that arbitrary viewing position information other than the predefined (pre-agreed) viewing position information is used as in the cases of 0000 and 0001 described above.

The viewer_position_dist field indicates an appropriate viewing distance according to the arbitrary viewing position information when the arbitrary viewing position information rather than the predefined (pre-agreed or normalized) viewing position information is used. The value of this field may be expressed as a distance with respect to a reference screen size, and if necessary, the reference screen size may be separately signaled.

The viewer_position_angle field indicates an appropriate viewing angle according to the arbitrary viewing position information when the arbitrary viewing position information rather than the predefined (pre-agreed or standardized) viewing position information is used.

The viewer_position_height field indicates an appropriate viewing height according to the arbitrary viewing position information when the arbitrary viewing position information rather than the predefined (pre-agreed or standardized) viewing position information is used.

The reference_for_position field indicates reference information about an appropriate viewing distance, an appropriate viewing angle, and/or an appropriate viewing height according to the arbitrary viewing position information when the arbitrary viewing position information rather than the predefined (pre-agreed or standardized) viewing position information is used. In an embodiment, the center of the display screen may be used as reference information, or an arbitrary position on the display screen may be used as the reference information. When an arbitrary position on the display screen is used as the reference information, the type of the reference information may be classified, and the specific position of the reference may be designated and signaled. In this case, the position of the sensor may be used as the reference information.

According to an embodiment, the illuminance and/or color temperature information about the target ambient light at the time of content creation or the illuminance and/or color temperature information about an ambient light at the time of content creation may be signaled, using the ambient illuminance field, the ambient_light_x field, and/or the ambient_light_y field in the viewing condition metadata SEI message. For example, the conditions identified in Rec. ITU-R BT.2035 can be expressed using ambient illuminance equal to 100000 with background chromaticity indicating D65 (ambient_light_x equal to 15635, ambient_light_y equal to 16450), or optionally, in some regions, background chromaticity indicating D93 (ambient_light_x equal to 14155, ambient_light_y equal to 14855).

According to an embodiment, the viewing condition metadata may be defined in XML (Extensible Markup Language) as well as in binary format. According to an embodiment, the viewing condition metadata defined in XML may be transmitted through video metadata, system metadata, and the like. The viewing condition metadata may be transmitted through MPEG2-TS, Dynamic Adaptive Streaming over HTTP (DASH), ISO BMFF (Base Media File Format), IMF (Interoperable Master Format), MXF and/or a transmission format used in a similar system.

FIG. 5 is a diagram illustrating configuration of an ambient_light_condition field, an ambient_light_color_temperature field, and a viewer_position_condition field according to an embodiment of the present invention.

A detailed description of each table shown in this figure has been given above in the description of the ambient_light_condition field, ambient_light_color_temperature field and viewer_position_condition field in the previous figure.

FIG. 6 is a diagram illustrating signaling of a UHD service based on viewing condition metadata according to an embodiment of the present invention.

In an embodiment, a program map table (PMT) may be used to signal that the corresponding UHD service is a UHD service based on viewing condition metadata.

The viewing condition metadata may be transmitted through an SEI message, transmitted in a stream loop of the PMT, or transmitted included in an event loop of an event information table (EIT).

The PMT L6010 according to an embodiment includes a table_id field, a section_syntax_indicator field, a section_length field, a program_number field, a version_number field, a current_next_indicator field, a section_number field, a last_section_number field, a PCR_PID field, a program_info_length field, a descriptor( ) field, a stream type field, an elementary_PID field, an ES_info_length field, a descriptor( ), and/or a CRC_32 field. The table_id field identifies the type of the table. The table_id field may serve to indicate that the table section is a section constituting the PMT. The section_syntax_indicator field indicates the format of the table section following the field. If the value of the field is 0, this indicates that the table section is in a short format. If the value of the field is 1, the table section follows the normal long format. The section_length field indicates the length of the table section. Since the section_length field indicates the length from the end of the field to the end of the table section, the actual length of the table section may be a value acquired by adding 3 bytes to the value indicated by the sercion_length field. The program_number field identifies each program service or virtual channel present in the transport stream. The version_number field indicates the version number of the private table section. The receiver may discover the most recent table section stored in the memory using the field and the current_next_indicator field, which will be described later. If the value indicated by the current_next_indicator field is 1, this indicates that the currently transmitted table is valid. If the current_next_indicator field is 0, this indicates that the currently transmitted table is not valid at present but will be valid thereafter. The section_number field indicates the sequence number of the section in the table. The last_section_number field indicates the sequence number of the last section among the sections constituting the table. The PCR_PID field indicates a packet ID with a PCR (Program Clock Reference) for a program service. The program_info_length field indicates the length of a descriptor indicating program information (program_info) following this field. Descriptor( ) means a descriptor indicating information about a program corresponding to the table section. According to an embodiment, the descriptor may include a UHD_program_info_descriptor( ) for identifying the type of the UHD service. The stream type field indicates the type of each unit stream constituting the program described in the table. The elementary_PID field indicates the packet ID of each unit stream constituting the program described in the table. The ES_info_length field indicates the length of a descriptor indicating information about each unit stream (ES_info) that follows this field. The descriptor( ) indicates a descriptor indicating information about one unit stream among the unit streams constituting the program described in the table. This descriptor may include a descriptor (viewing_condition_info_descriptor( )) containing viewing condition metadata. The CRC 32 field indicates a CRC value used to check whether there is an error in the data included in the table section. The PMT may be transmitted using an in-band scheme through the MPEG-TS and the entire PSI information including the PMT may be transmitted in the form of xml through the IP.

The descriptors included in the program loop of the PMT according to an embodiment may include UHD_program_info_descritpor( ), and the descriptors included in the stream loop of the PMT may include a descriptor (viewing_condition_info_descriptor( )) containing viewing condition metadata.

The UHD_program_info_descritor( ) L6020 may be included in the program loop of the PMT, and may include a descriptor_tag field, a descriptor_length field, and/or a UHD_service_type field. The descriptor_tag field indicates that this descriptor is UHD_program_info_descritpor( ) for identifying the UHD service. The descriptor_length field indicates the length of this descriptor. The UHD_service_type field indicates the type of the UHD service.

If the value of the UHD_service_type field L6030 is 0000, the UHD1 service may be identified. If the value is 0001, the UHD2 service may be identified. If the value is 1010, the UHD1 service based on the viewing condition metadata may be identified.

The UHD_service_type field may indicate information about the type of the UHD service (for example, UHD service type designated by the user according to UHD1 (4K), UHD2 (8K), quality). An embodiment may designate UHD_service_type=1010 (an example of UHD1 service with adaptive viewing condition, 4K) to signal that the viewing condition metadata is used.

FIG. 7 is a diagram illustrating signaling of a UHD service based on viewing condition metadata according to another embodiment of the present invention.

According to an embodiment, the ATSC-EIT L7010 includes a table_id field, a section_syntax_indicator field, a section_length field, a service_id field, a version_number field, current_next_indicator field, a section_number field, a last_section_number field, a transport_stream_id field, an original_network_id field, a segment_last_section_number field, a last_table_id field, an event id field, a start time field, a duration field, a running status field, a free_CA_mode field, a descriptors_loop_length field, descriptor( ), and/or a CRC_32 field. The table_id field identifies the type of the table. The table_id field may serve to indicate that the table section is a section constituting the EIT. The section_syntax_indicator field indicates the format of the table section following the field. If the value of the field is 0, the table section is in short format. If the value of the field is 1, the table section conforms to the normal long format. The section_length field indicates the length of the table section. The section_length field may indicate the length from the end of the field to the end of the corresponding table section. The service_id field identifies each service in the transport stream. The service_id field may have the same function as the program_number field in the PMT. The version_number field indicates the version number of a private table section. The receiver may discover the most recent table section stored in the memory using the field and the current_next_indicator field, which will be described later. If the value represented by the current_next_indicator field is 1, this indicates that the currently transmitted table is valid. If the current_next_indicator field is 0, this indicates that the currently transmitted table is not valid at present but will be valid thereafter. The section_number field indicates the sequence number of the section in the table. The last_section_number field indicates the sequence number of the last section among the sections constituting the table. The transport_stream_id field identifies a transport stream (TS) to be described in the table. The original_network_id field may identify the first broadcast station that transmitted the service or event described in the table. The segment_last_section_number field indicates the last section number of the segment if a sub table exists. If the sub table is not segmented, the value indicated by the field may be equal to the value indicated by the last_section_number field. The last_table_id field indicates the last table_id used. The event id field identifies each event and has a unique value within a service. The start_time field indicates the start time of the event. The duration field indicates the duration of the event. For example, if the program lasts 1 hour, 45 minutes and 30 seconds, the duration field may represent 0x014530. The running status field indicates the status of the event. If the value of the free_CA_mode field is 0, this indicates that the component streams constituting the service are not scrambled. If the value of the free_CA_mode field is 1, access to one or more streams is regulated by the CA system. The CA system is an abbreviation of Conditional Access System, which means a system for providing an encryption function of broadcast content and a function of allowing only the contractor to decrypt and watch broadcast content in order to restrict viewing of broadcasting to contractors. The descriptors_loop_length field presents a value obtained by adding the lengths of the descriptors following the field. Descriptor( ) is a descriptor describing each event. According to an embodiment, this descriptor may include UHD_program_info_descriptor( ) indicating the type of the UHD service and/or viewing_condition_info_descriptor( ). The CRC_32 field indicates a CRC value used to check whether there is an error in the data included in the table section.

The DVB SI-EIT (L7020) according to an embodiment may include the fields included in the ATSC-EIT L7010, a service_id field, a transport_stream_id field, an original_network_id field, a segment_last_section_number field, a last_table_id field, a duration field, a running status field, a free_CA_mode field, a descriptors_loop_length field, and/or descriptor( ). The service_id field indicates the identifier of a service associated with the table. The transport_stream_id field indicates an identifier of a transport stream through which the corresponding table is transmitted. The original_network_id field indicates the identifier of a network over which the corresponding table is transmitted. The segment_last_section_number field indicates the last section number of a segment. The last_table_id field indicates the identifier of the last table. The duration field indicates the duration of an event. The running status field indicates the status of the event. The free_CA_mode field indicates whether the event is encrypted or not. The descriptors_loop_length field indicates the length of the descriptor loop at the event level. Descriptor( ) is a descriptor describing each event. According to an embodiment, this descriptor may include UHD_program_info_descriptor( ) indicating the type of the UHD service and/or viewing_condition_info_descriptor( ).

The descriptors included in the event loop of the EIT may include UHD_program_info_descritpor( ) and/or viewing_condition_info_descriptor( ).

In the event loop of the EIT, UHD_service_type=1010 (an example of User private: UHD1 service with enhanced gamut mapping metadata, 4K) may be specified in UHD_program_info_descritpor( ) to signal that viewing condition metadata is delivered.

In the event loop of the EIT, if the value of the UHD_service_type field in the UHD_program_info_descritpor( ) is 0000 (UHD1 service), the viewing condition metada is delivered by checking whether the viewing_condition_info_descriptor is present. Here, the viewing_condition_info_descriptor( ) may be used to determine whether or not the content provider can utilize desired viewing environment information on the display of the viewer. According to an embodiment, by including the viewing_condition_info_descriptor( ) in the event loop of the EIT, the receiver may be allowed to determine whether to use the viewing condition metadata for the content to be reproduced at present or at a future time and to preconfigure the settings for a situation such as reserved recording.

In an embodiment, viewing_condition_info_descriptor( ) may be included at the event level to signal whether the metadata for transmission of information related to the viewing environment is included and may determine whether the receiver can receive the information indicated by the metadata.

According to an embodiment, in the case of cable broadcasting, the information included in the EIT described above may be included in the AEIT.

FIG. 8 is a diagram illustrating configuration of viewing_condition_info_descriptor( ) and configuration of viewing condition metadata according to an embodiment of the present invention.

According to an embodiment, there may be information on a plurality of recommended viewing environments for one event. That is, information for improving the brightness and/or color may not be consistently applied. Instead, the information for improving the brightness and/or color may be converted according to time or presence or absence of inserted content. Furthermore, various viewing environment modes intended by the producer may be supported for one piece of content. According to an embodiment, it is necessary to determine whether the viewing environment modes are acceptable on the display of the receiver, and information about each viewing environment mode may be provided through the viewing condition metadata. Here, the information for improving the brightness and/or color may refer to the recommended viewing environment information.

According to an embodiment, the viewing_condition_info_descriptor( ) L8010 may include a descriptor_tag field, a descriptor_length field, a number_of_info field, and/or viewing_condition_metadata( ).

The descriptor_tag field indicates that this descriptor contains viewing condition metadata.

The descriptor_length field indicates the length of this descriptor.

The number_of_info field indicates the number of recommended viewing condition metadata provided by the producer.

Viewing_condition_metadata( ) L8020 indicates the viewing condition metadata. According to an embodiment, the viewing condition metadata, viewing_condition_metadata( ), viewing_condition, and recommended viewing environment information may have the same meaning. Details of the viewing condition metadata have been described above.

Figure 9:
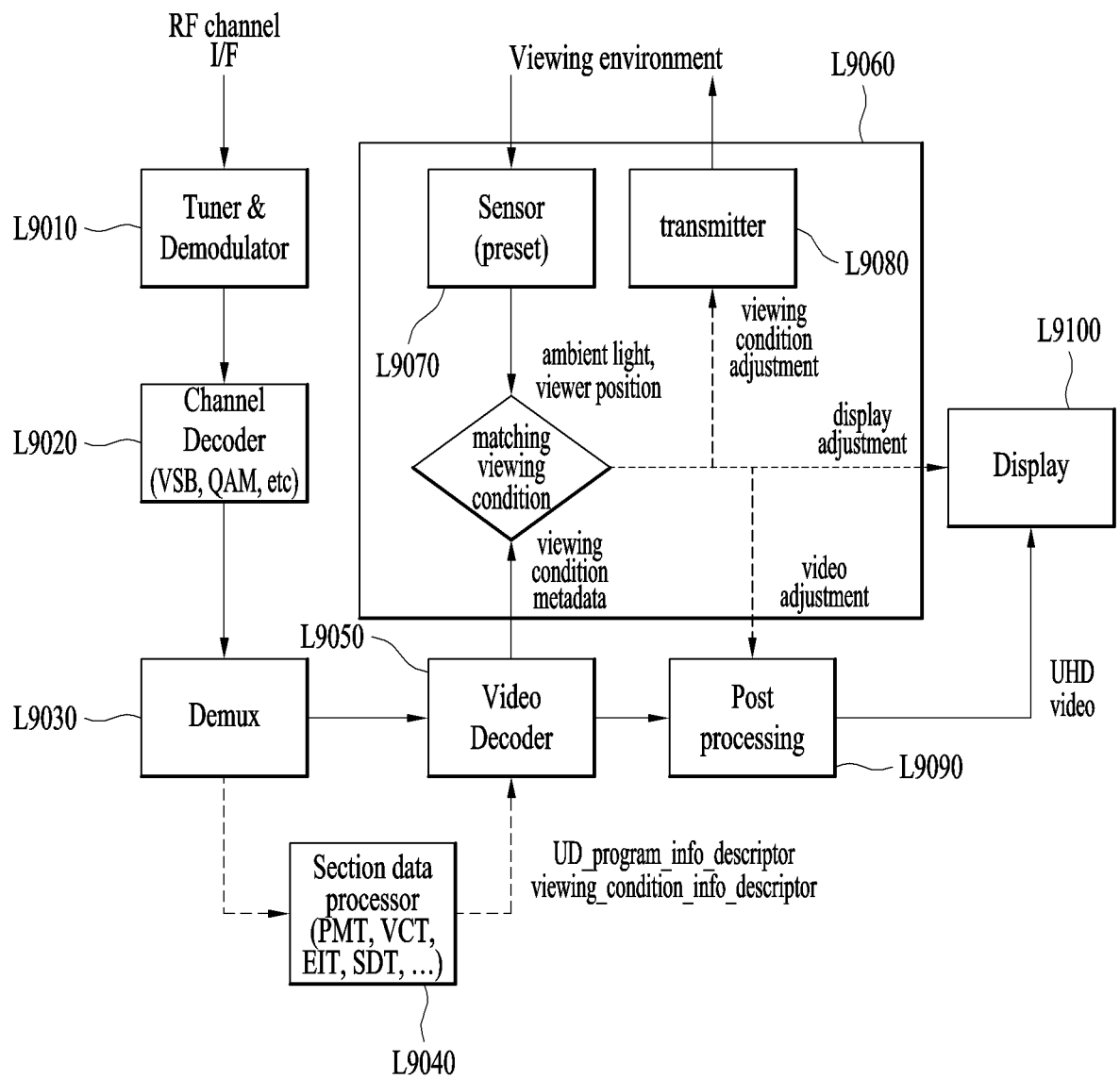
FIG. 9 is a block diagram of a receiver adaptive to a viewing environment according to an embodiment of the present invention.

FIG. 9 is a block diagram of a receiver adaptive to a viewing environment according to an embodiment of the present invention.

The receiver adaptive to the viewing environment according to an embodiment may include a tuner L9010, a demodulator L9010, a channel decoder L9020, a demultiplexer L9030, a signaling information processor (section data processor) L9040, a video decoder L9050, a controller L9060, a post processor L9090, and/or a display L9100. The tuner may receive a broadcast signal including recommended viewing environment information and UHD content. The demodulator may demodulate the received broadcast signal. The channel decoder may channel-decode the demodulated broadcast signal. The demultiplexer may extract signaling information including the recommended viewing environment information and the like, video data, audio data, and the like from the broadcast signal. The section data processor may process section data such as PMT, VCT, EIT, and SDT in the received signaling information. The video decoder may decode the received video stream. At this time, the video decoder may decode the video stream using the information included in viewing_condition_info_descriptor( ) and/or UHD_program_info_descritpor( ) included in PMT, EIT, and the like extracted by the section data processor. The controller may include a sensor L9070 and/or a transmitter L9080. The sensor may acquire the current viewing environment information of the viewer. The controller may compare the acquired current viewing environment information with the recommended viewing environment information included in the video stream and/or the system level to adjust the brightness/color of the current viewing environment information, the content, and/or the display. The transmitter may transmit the adjusted viewing environment information to the user. The post processor may process the color and/or brightness of the content (video) to provide an optimal viewing environment under control of the controller. The display may display video processed by the post processor, and adjust the color and/or brightness of the display to provide an optimal viewing environment under control of the controller.

FIG. 10 is a diagram illustrating equations used in adjusting the brightness and/or color of a display and/or content to provide an optimal viewing environment, in accordance with an embodiment of the present invention.

The process of analyzing a broadcast signal and adjusting a viewing environment in the receiver according to an embodiment is configured as follows.

The receiver may determine whether there is a separate service or media to be additionally received in order to construct the original UHDTV broadcast using the UHD_program_info_descriptor of the received PMT. When the value of the UHD_service_type field in the UHD_program_info_descriptor is 1010, the receiver may recognize that there is additional information transmitted through the SEI message. According to an embodiment, if the value of the UHD_service_type field in the UHD_program_info_descriptor is 0000 (8K is 0001) and the viewing_condition_info_descriptor is present in the event loop of the EIT, the receiver may recognize that there is additional video related information transmitted through the SEI message. This process may be performed by the tuner and/or the section data processor of the receiver.

In an embodiment, the receiver recognizes the information about a recommended viewing environment through the viewing condition metadata SEI message and/or viewing_condition_info_descriptor of the EIT. According to an embodiment, when the light and/or the viewing position are taken into consideration as elements of the recommended viewing environment, information such as the brightness of the light, the color temperature of the light, the recommended viewing distance, the recommended viewing angle, and the recommended viewing height may be transmitted. The transmitting party may signal the predefined recommended ambient light information and/or the recommended viewing position information using the ambient_light_condition field and/or the viewer_position_condition field. The transmitting party may specifically signal the brightness and the color temperature through the ambient_light_intensity field (ambient_light_level field), ambient_light_color_temperature field, ambient_light_color_temperature_x field, and/or ambient_light_color_temperature_y field, and signal information about criteria for determining the viewing distance, the viewing angle, the viewing height, and the viewing position through the viewer_position_dist field, viewer_position_angle field, viewer_position_height field and reference_for_position field.

According to an embodiment, the receiver may collect data about the current viewing environment. According to an embodiment, the viewer may directly input data and/or collect, through a sensor, data on the current viewing environment, using preset values. This process may be performed by the controller of the receiver.

According to an embodiment, the receiver may determine whether the current viewing environment is appropriate based on the data (current viewing environment information) about the current viewing environment and data (recommended viewing environment information) given as an appropriate viewing environment. If it is determined that the current viewing environment is appropriate, the displaying operation may be performed without any processing. If it is determined that the viewing environment needs to be adjusted, different processing may be performed according to performance of the receiver. This process may be performed by the controller of the receiver.

The receiver may inform the user that the viewing environment needs to be adjusted. The receiver may announce, on the display screen, that the viewing environment needs to be adjusted, such that the viewer may directly adjust the viewing environment such as the brightness/color of the light, the viewing position, and the like. According to an embodiment, if the brightness/color of the light, the viewing position, and the like can be identified in real time through a sensor or the like, the accuracy of adjustment may be improved by feeding back the adjustment result in real time. This process may be performed by the controller of the receiver.

The receiver may directly adjust the viewing environment. According to an embodiment, when the receiver can control the light and/or the viewing position, the receiver may automatically adjust the viewing environment by directly transmitting the brightness/color temperature (recommended ambient light information) of the target light and/or the recommended viewing position information or transmitting a value for adjustment as a configuration for adjusting the light and/or the viewing position. At this time, technologies such as Internet of things may be used. This process may be performed by the controller of the receiver.

According to an embodiment, the receiver may adjust the brightness and/or color of the display according to the ambient environment when it cannot directly adjust the viewing environment. The receiver may change the brightness and/or color temperature setting of the output signal of the display so as to compensate for the brightness and/or color temperature of the ambient light. For example, if the brightness of the ambient light is relatively high, sensitivity to the dark area may be reduced due to bright adaptation of the eyes, and thus the perceived dynamic range may be relatively narrowed. In this case, the increased amount of the brightness of the ambient light may be compensated for by increasing the brightness of the output signal of the display. On the other hand, when the brightness of the ambient light is low, the brightness of the display output signal may be lowered to compensate for changes in the visual system adapted to darkness by the ambient light. According to an embodiment, the brightness V of the display output signal may be a function of $f\_v$ and offset $a\_v$, and the receiver may adjust the brightness of the display output signal to compensate for the changed value with respect to the target value using the function of $f\_v$. Here, $f\_v$ may be a non-decreasing function (for example, an increasing function of ratio) of the brightness value (Light_ambient) of the ambient light and the recommended brightness (Light_reference). Here, $V^\wedge$ denotes the adjusted brightness of the display output signal and V denotes the brightness of the display output signal before adjustment (L10010). This process may be performed by the controller of the receiver and/or the display. When the color temperature of the ambient light is taken into consideration, the receiver may change the light emission characteristics of each RGB pixel that expresses a color in a display output signal. For example, when the color temperature of the ambient light is high, that is, when the color temperature of the light is high, the image may appear to be bluer than the intended color, and the receiver may adjust the color temperature of the display to compensate the color. According to an embodiment, the brightness values $V\_R$, $V\_G$ and $V\_B$ of the output signals of the RGB pixels of the display are functions of $f\_c$ and offset $a\_R$, $a\_G$ and $a\_B$, and the receiver may use the function $f\_c$ to adjust the color temperature of the display output signal to adjust the color so as to compensate for the changed value with respect to a target value. Here, $f\_c$ may be a non-decreasing function (for example, an increasing function of ratio) of a color temperature value of an ambient light (C_ambient) and an intended color temperature value (C_reference) of an image. Here, $V^\wedge\_R$, $V^\wedge\_G$ and $V^\wedge\_B$ denote the brightness of the adjusted display output signals, and $V\_R$, $V\_G$ and $V\_B$ denote the brightness of the display output signals before adjustment (L10020). This process may be performed by the controller of the receiver and/or the display.

In a case where the receiver cannot directly adjust the viewing environment and a case where the receiver cannot directly adjust the brightness and/or color of the display, the receiver may adjust the brightness and/or color of the content in order to obtain an effect similar to the effect of adjusting the ambient environment. In this case, according to an embodiment, although a separate module may be required, the brightness and/or color of the content may be adjusted by utilizing functions such as transfer curve, tone mapping, and white balance which are performed by an image processing module. In the case where the receiver adjusts the image (content) according to the ambient light environment, the receiver may change the settings of the brightness and/or color temperature of the image to compensate for the brightness and/or color temperature of the ambient light. According to an embodiment, the brightness and/or color of the content may be adjusted using at least one of a video mapping module, a tone mapping module, a transfer curve module, a white balance module, and a color correction module, which are video post-processing modules included in the receiver. According to an embodiment, when the brightness of the ambient light is relatively high, sensitivity of the eye to the dark area may be reduced. In this case, by increasing the brightness of the image, representation of the dark area may be relatively enhanced. On the other hand, when the ambient light is dim, the brightness of the image may be dimmed to compensate for changes in the visual system adapted to darkness by the ambient light. According to an embodiment, the brightness value V of the image is a function of $f\_y$ and offset $a\_y$, and the receiver may adjust the brightness of the image to compensate for the changed value with respect to the target value using the function $f\_y$. Here, $f\_y$ may be a non-decreasing function (for example, an increasing function of ratio) of the brightness value (Light_ambient) of the ambient light and the recommended brightness (Light_reference). Here, $Y^\wedge$ denotes the brightness value of the adjusted image, and Y denotes the brightness value of the image before adjustment (L10030). The receiver may change the color of the image when the color temperature of the ambient light is taken into consideration. According to an embodiment, the output signal brightness values R, G, and B of RGB pixels of an image are functions of $f\_M$ and offset $a\_r$, $a\_g$, and $a\_b$, and the receiver may use the function $f\_M$ to change the color temperature of the image to change the color so as to compensate for the changed value with respect to the target value. Here, $f\_M$ may be a non-decreasing function (for example, an increasing function of ratio) of a color temperature value (C_ambient) of the ambient light and an intended color temperature value (C_reference). Here, R', G' and B' denote the brightness of the adjusted image output signal, and R, G and B denote the brightness of the video output signal before adjustment (L10040). This process may be performed by the controller and/or the post processor of the receiver.

According to an embodiment, the receiver may adjust the color/brightness of the display and/or content according to performance thereof.

According to an embodiment, brightness and/or color adjustment according to the viewing position may also be expressed as a function of the difference between the actual viewing distance and the recommended viewing distance, as described above regarding the light.

According to an embodiment, the receiver may reproduce an image after adjustment of an ambient environment or adjustment of a receiver environment for a relative effect. Here, adjusting the receiver environment for a relative effect may mean adjusting the color and/or brightness of the display and/or content to obtain an effect similar to that of adjusting the ambient environment in a case where the ambient environment cannot be adjusted.

Figure 11:
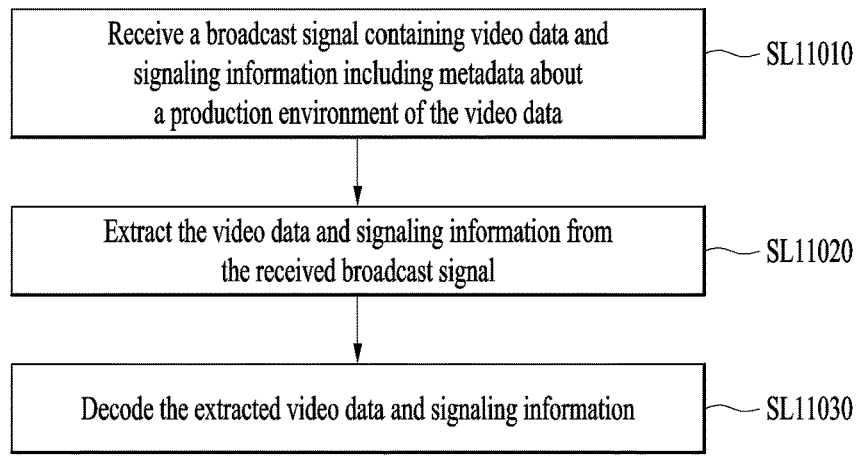
FIG. 11 is a diagram illustrating a method for receiving a broadcast signal according to an embodiment of the present invention.

FIG. 11 is a diagram illustrating a method for receiving a broadcast signal according to an embodiment of the present invention.

The method for receiving a broadcast signal according to an embodiment may include receiving a broadcast signal including signaling information including video data and metadata about a production environment of the video data (SL11010), extracting the video data and signaling information from the received broadcast signal (SL11020), and/or decoding the extracted video data and signaling information (SL11030). Here, the metadata about the production environment of the video data may indicate viewing condition metadata. A detailed description thereof has been given above with reference to FIG. 4.

According to another embodiment, the metadata may include information about target ambient light at the time of producing the video data and/or information about a target viewing position at the time of producing the video data. Here, the information about the target ambient light at the time of producing the video data may represent the information indicated by the ambient_light_condition field, and the information about the target viewing position at the time of producing the video data may represent the information indicated by the viewer_position_condition field. A detailed description thereof has been given above with reference to FIGS. 4 and 5.

According to another embodiment, the metadata may include information about the brightness of the target ambient light at the time of producing the video data and/or information about the color temperature of the target ambient light at the time of producing the video data. The information about the brightness of the target ambient light at the time of producing the video data may represent the information indicated by the ambient_light_level field and the information about the color temperature of the target ambient light at the time of producing the video data may represent the information indicated by the ambient_light_color_temperature field. A detailed description thereof has been given above with reference to FIGS. 4 and 5.

According to another embodiment, the metadata may include information about a target viewing distance at the time of producing the video data, information about a target viewing angle at the time of producing the video data, and/or information about a target viewing height at the time of producing the video data. Here, the information about the target viewing distance at the time of producing the video data, the information about the target viewing angle at the time of producing the video data, and the information about the target viewing height at the time of producing the video data may represent information indicated by the viewer_position_dist field, viewer_position_angle field, viewer_position_height field and reference_for_position field. A detailed description thereof has been given above with reference to FIGS. 4 and 5.

According to another embodiment, the signaling information may include a descriptor related to the production environment of the video data. The descriptor may include one or more of the metadata and/or information indicating the number of the metadata included in the descriptor. Here, the metadata may indicate viewing_condition_info_descriptor, and the information indicating the number of the metadata included in the descriptor may represent the information indicated by the number_of_Info field. A detailed description thereof has been given above with reference to FIG. 8.

According to another embodiment, the signaling information may include UHD service information indicating the type of a UHD (Ultra High Definition) service including the video data. The UHD service information may include information indicating that the UHD service is a UHD broadcast service including the metadata. Herein, the UHD service information may mean UHD_program_info_descriptor and/or information included in this descriptor. The information indicating that the UHD service is a UHD broadcast service including the metadata may mean information indicated by the UHD_service_type field. A detailed description thereof has been given above with reference to FIG. 6.

Figure 12:
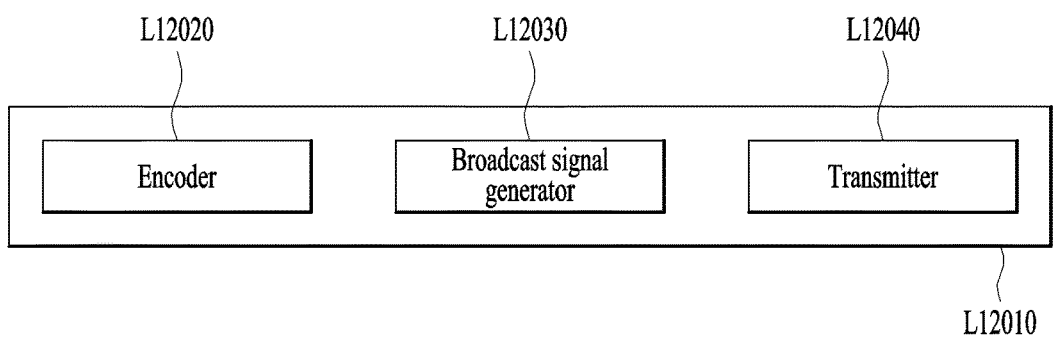
FIG. 12 is a block diagram of a broadcast signal transmitting apparatus according to an embodiment of the present invention.

FIG. 12 is a block diagram of a broadcast signal transmitting apparatus according to an embodiment of the present invention.

A broadcast signal transmitting apparatus L2010 according to an embodiment may include an encoder L12020 for encoding signaling information including video data and metadata about a production environment of the video data, a broadcast signal generator L12030 for generating a broadcast signal including the video data and signaling information, and/or a transmitter L12040 for transmitting the generated broadcast signal. Here, the metadata about the production environment of the video data may represent viewing condition metadata.

Figure 13:
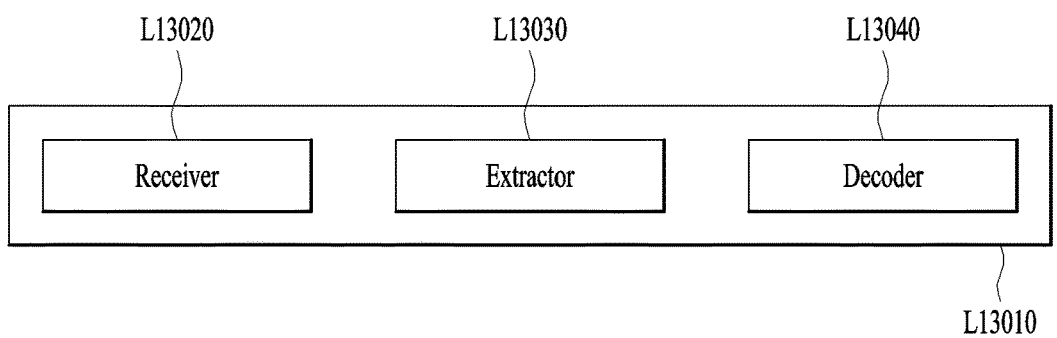
FIG. 13 is a diagram illustrating configuration of a broadcast signal receiving apparatus according to an embodiment of the present invention.

FIG. 13 is a diagram illustrating configuration of a broadcast signal receiving apparatus according to an embodiment of the present invention.

A broadcast signal receiving apparatus L13010 according to an embodiment may include a receiver L13020 for receiving a broadcast signal including signaling information including video data and metadata about a production environment of the video data, an extractor L13030 for extracting the video data and signaling information from the broadcast signal, and/or a decoder L13040 for decoding the extracted video data and signaling information. Here, the metadata about the production environment of the video data may indicate the viewing condition metadata. The receiving unit L13020 may perform the same function as the receiver L9010 described above and the extractor L13030 may perform the same function as the demultiplexer L9010 described above. The decoder L13040 may perform the same function as the video decoder L9050 described above.

A module, unit or block in accordance with embodiments of the present invention may be a processor/hardware that executes sequential execution processes stored in a memory (or storage unit). Each step or method described in the above embodiments may be performed by hardware/processors. Further, the methods proposed by the present invention may be executed as code. This code may be written to a storage medium readable by the processor and thus readable by a processor provided by an apparatus according to embodiments of the present invention.

Although the drawings have been separately described for convenience of explanation, it is also possible to design a new embodiment to be implemented by merging embodiments described in the respective drawings. It is also within the scope of the present invention to design a computer-readable recording medium in which a program for executing the previously described embodiments is recorded according to the needs of those skilled in the art.

The apparatus and method according to the present invention are not limited to the configuration and method of the embodiments described above, but the embodiments described above may be modified so that all or some of the embodiments are selectively configured in combination.

The image processing method of the present invention may be implemented on a recording medium readable by a processor included in a network device as code that can be read by the processor. The processor-readable medium may include all kinds of recording devices capable of storing data readable by a processor. The processor-readable medium may include one of ROM, RAM, CD-ROM, magnetic tapes, floppy disks, optical data storage devices, and the like, for example, and may also include a carrier-wave type implementation such as a transmission via the Internet. Furthermore, as the processor-readable recording medium is distributed to a computer system connected via a network, processor-readable code may be saved and executed according to a distributed system.

It will be appreciated by those skilled in the art that various modifications and variations may be made in the present invention without departing from the spirit or scope of the invention. Thus, it is intended that the present invention cover the modifications and variations of this invention provided they come within the scope of the appended claims and their equivalents.

Both a product invention and a process invention are described in this specification and the description of both inventions may be supplementarily applied as needed.

MODE FOR INVENTION

Various embodiments have been described in the best mode for carrying out the invention.

INDUSTRIAL APPLICABILITY

The present invention is used in a broadcast signal providing field.

It will be apparent to those skilled in the art that various modifications and variations may be made in the present invention without departing from the spirit or scope of the invention. Thus, it is intended that the present invention covers the modifications and variations of this invention provided they come within the scope of the appended claims and their equivalents.

The invention claimed is:

1. A digital receiver for processing at least one video content, the digital receiver comprising:
a receiving module configured to receive the at least one video content and an SEI (supplemental enhancement information) message, wherein the SEI message identifies characteristics of a nominal viewing environment for displaying the at least one video content,
wherein the SEI message further comprises a first element for an environmental illuminance, a second element for an X chromaticity coordinate of an environmental ambient light in the nominal viewing environment according to CIE and a third element for a Y chromaticity coordinate of the environmental ambient light in the nominal viewing environment according to CIE;
a first sensor configured to sense a viewing environment, wherein the viewing environment is different from an environment when mastering the at least one video content;
a second sensor configured to sense a distance between a user and the digital receiver by using a camera; and
a controller configured to directly adjust an ambient light in the viewing environment when the digital receiver is able to communicate with a separate light controller based on Internet of Things (IoT) communication,
wherein the controller is further configured to reduce the overall brightness of a display module or reduce an area of a bright region of the at least one video content when the user's position is closer than a recommended viewing position and the digital receiver is unable to communicate with the separate light controller based on the IoT communication, and
wherein the controller is further configured to increase the overall brightness of the display module or increase the area of the bright region of the at least one video content when the user's position is longer than the recommended viewing position and the digital receiver is unable to communicate with the separate light controller based on the IoT communication.

2. The digital receiver of claim 1, wherein the controller is further configured to compare the sensed viewing environment with the SEI message.

3. The digital receiver of claim 2, wherein the controller is further configured to provide an option to change an illuminance of the digital receiver when the sensed viewing environment does not match with the SEI message.

* * * * *